United States Patent Office 2,705,234
Patented Mar. 29, 1955

2,705,234

POLYMETHINE DYES

John David Kendall and Douglas James Fry, Ilford, England, assignors to Ilford Limited, Ilford, England, a British company No Drawing. Application February 25, 1952, Serial No. 273,344

Claims priority, application Great Britain March 5, 1951

6 Claims. (Cl. 260—240.5)

This invention relates to polymethine dyestuffs.

In application Serial No. 214,016, filed March 5, 1951, now U. S. Patent No. 2,637,729, issued May 5, 1953,

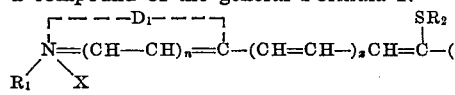

there is described a process for the production of cyanine dyes which comprises heating with a primary alkylamine (including cycloalkylamine), aralkylamine or arylamine a compound of the general Formula I:

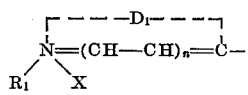

where $R_1$ and $R_3$ are the same or different and each represents an alkyl, hydroxyalkyl or aralkyl group, $R_2$ represents an alkyl or aralkyl group, $D_1$ and $D_2$ are the same or different and each represents the residue of a five-membered or six-membered heterocyclic ring system of the type known for use in cyanine dyes, X represents an acid radical, and $n$, $m$, $x$ and $y$ are the same or different and each represents nought or one.

Preferably $R_1$ and $R_3$ represent lower alkyl groups, e. g. methyl, alkyl, propyl or butyl, or corresponding hydroxyalkyl groups, and $R_2$ also represents a lower alkyl group, e. g. methyl, ethyl, propyl or butyl.

$D_1$ and $D_2$ may each be the residue of any of the types of heterocyclic nuclei commonly employed in photographic sensitising dyes, e. g. thiazoles, oxazoles, selenazoles and their polycyclic homologues such as those of the benzene, naphthalene, acenaphthene and anthracene series; pyridine and its polycyclic homologues such as quinoline and α and β naphthaquinolines; lepidines; indolenines; diazines such as pyrimidines and quinazolines; diazoles (e. g. thio-ββ'-diazone), oxazolines, thiazolines and selenazolines. The polycyclic compounds of these series may be substituted in the carbocyclic rings by one or more groups such as alkyl, aryl, amino, hydroxy, alkoxy and methylenedioxy groups or by halogen atoms.

The acid radical X may be, for example, a halide radical (chloride, bromide or iodide), alkyl sulphate or p-toluene sulphonate.

The basic reagent employed may be aniline or another primary aliphatic or aromatic amine.

The products have the general Formula II:

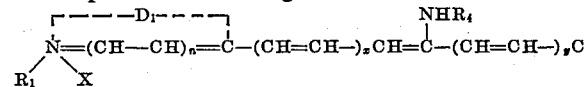

where $R_4$ is an alkyl, cycloalkyl, aralkyl or aryl radical and the other symbols have the meanings assigned to them above.

According to the present invention further cyanine dyes of related structure may be obtained by treating a dyestuff of the Formula II with a strong base. Preferably a strong inorganic base is employed, such as an alkali hydroxide, but strong organic bases such as sodium ethoxide or other alkali alkoxides may also be employed. The effect of the treatment is to remove the elements HX from the compounds so that they conform to the general Formula III:

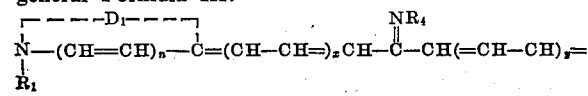

The compounds of general Formula III are also valuable sensitisers for photographic silver halide emulsions and particularly photographic gelatino silver bromide emulsions.

According to a further aspect of the present invention, a further new class of cyanine dyestuff is obtained by treating a compound of the general Formula III with a compound of the general formula $R_5X$ which is capable of forming a quaternary salt with an amine, $R_5$ being an alkyl or aralkyl radicle and X being the anion of a strong acid. Typical compounds $R_5X$ which may be employed in this aspect of the invention are methyl and ethyl iodides and p-toluene sulphonates and β-hydroxyethyl bromide.

The products have the general Formula IV:

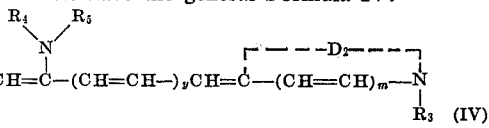

and, like the parent compounds, are valuable sensitisers for photographic silver halide emulsions.

The following examples will serve to illustrate the invention. The new compounds of Formula III have been named as hydrocarbons terminally substituted by dihydro heterocyclic radicles linked by double bonds to the hydrocarbon chain and with an imino substituent in the chain.

EXAMPLE 1

*1:3-bis-(3-methyl - 2:3 - dihydrobenzthiazolylidene)-2-(phenylimino) propane*

3:3'-dimethyl-9-anilinothiacarbocyanine bromide (4 g.) was suspended in warm methanol (200 cc.) and stirred while 2½% sodium hydroxide solution (40 cc.) was added; the colour changed from red to yellow. The mixture was diluted with water and the precipitated product filtered off. After drying, it was purified by extracting in a Soxhlet extractor with ether. The ether solution was concentrated when the product separated as orange-yellow crystals, m. pt. 197° C. Incorporated in a gelatino-silver iodobromide emulsion it extended the sensitivity to 6600 Å. with a maximum at 5950 Å.

EXAMPLE 2

*1-(3-methyl - 2:3 - dihydrobenzthiazolylidene)-3-(3-ethyl-2:3-dihydrobenzthiazolylidene)-2-(phenylimino) propane*

3-methyl-3'-ethyl-9-anilinothiacarbocyanine iodide (10 g.) was mixed with a solution of sodium (2.3 g.) in methanol (200 cc.) and the mixture heated on a water-bath for 30 minutes. The yellow product was filtered off after cooling, and washed with cold methanol. It was purified by extraction in a Soxhlet extractor with ether, from which it separated as yellow fluffy crystals, m. pt. 172–173° C. Incorporated in a gelatino-silver iodobromide emulsion it extended the sensitivity to 6200 A. with a maximum at 5950 Å.

EXAMPLE 3

*1-(3-methyl - 2:3 - dihydrobenzthiazolylidene) - 3 - (3-ethyl-2:3-dihydrobenzthiazolylidene) - 2 - (4 - ethoxyphenylimino) propane*

3-methyl-3'-ethyl-9-phenetidinothiacarbocyanine iodide (5 g.) was ground in a mortar with acetone and 10% sodium hydroxide solution (5 cc.); the red dye changed to an orange-yellow solid. The paste was diluted with water (120 cc.) and the product collected by filtration. The solid was purified by extraction in a Soxhlet extractor with ether, from which the dye separated as orange-yellow fluffy crystals, m. pt. 169–170° C. Incorporated in a gelatino-silver iodobromide emulsion it extended the sensitivity to 600 Å. with maxima at 5300 A. and 5800 Å.

EXAMPLE 4

*3 - methyl - 3' - ethyl-9-(methylphenylamino)thiacarbocyanine iodide*

1-(3-methyl-2:3-dihydrobenzthiazolylidene) - 3 - (3-ethyl - 2:3 - dihydrobenzthiazolylidene)-2-(phenylimino) propane (2.5 g.) was boiled with methyl iodide (20 cc.) for 10 hours; a magenta colour developed. The solution was diluted with ether (500 cc.) and the precipitated dye collected. It crystallised from methanol (100 cc.) as green prisms, m. pt. 167–169° C.

The same compound was obtained when the starting material (2.5 g.) was heated at 100° C. for 5 hours with methyl p-toluene sulphonate (5 g.). The magenta melt was dissolved in methanol and the dye precipitated as the iodide by treatment with aqueous potassium iodide; the dye obtained was recrystallised from methanol giving green prisms, m. pt. 167–169° C. Incorporated in a gelatino-silver iodobromide emulsion it extended the sensitivity to 6400 Å. with a maximum at 6150 Å.

EXAMPLE 5

*3 - methyl - 3' - ethyl - 9-(ethylphenylamino)thiacarbocyanine iodide*

The reaction described under Example 4 was repeated using ethyl iodide (20 cc.) in place of methyl iodide. The crude dye crystallised from aqueous alcohol as fine maroon crystals, m. pt. 163–165° C. (with decomposition). Incorporated in a silver iodobromide emulsion it extended the sensitivity to 6300 Å. with a maximum at 5950 Å.

EXAMPLE 6

*3 - methyl - 3' - ethyl - 9 - (4 - ethoxyphenylmethyl amino)thiacarbocyanine perchlorate*

1 - (3 - methyl - 2:3 - dihydrobenzthiazolylidene) - 3- (3 - ethyl - 2:3 - dihydrobenzthiazolylidene) - 2 - (4-ethoxyphenylimino) propane (2.5 g.) was heated on the water-bath for 10 hours with methyl iodide (20 cc.). The red solution was diluted with ether (200 cc.) and the precipitated crude product was converted to the perchlorate with aqueous sodium perchlorate. The perchlorate was purified by dissolution in ethanol (50 cc.) and precipitation with water (200 cc.) when it separated as fine red crystals, m. pt. 148° C.

EXAMPLE 7

*1 - (3 - methyldihydrobenzthiazolylidene) - 3 - (3 - ethyl-dihydrobenzthiazolylidene)-2-cyclohexyliminopropane*

0.54 gm. of 3-ethyl-3'-methyl-9-cyclohexylamino-thiacarbocyanine iodide was mixed with 20 mls. of methyl alcohol and 0.108 gm. of sodium hydroxide added, followed by 30 mls. of water. The mixture was extracted with ether, the extract dried with anhydrous sodium sulphate and evaporated in a vacuum desiccator. The residue was extracted in a Soxhlet extractor with dry ether, from which the product was obtained as a cream-coloured powder, m. pt. 169–171° C. When the dye was incorporated in a silver chlorobromide emulsion the sensitivity was extended to 5600 Å. with a maximum at 4900 Å.

EXAMPLE 8

*1 - (3 - methyldihydrobenzthiazolylidene) - 3 - (3-ethyldihydrobenzthiazolylidene)-2-methyliminopropane*

0.93 gm. of 3-ethyl-3'-methyl-9-methylaminothiacarbocyanine iodide was shaken with a mixture of 5 mls. of methyl alcohol and 5 mls. of normal sodium hydroxide solution. The mixture was extracted with ether, the extract dried with sodium sulphate and evaporated in vacuo. The product was obtained as an orange solid, m. pt. 134–137° C. When the dye was incorporated in a silver chlorobromide emulsion the sensitivity was extended to 5400 Å. with a maximum at 4950 Å.

EXAMPLE 9

*1 - (3 - methyldihydrobenzoxazolylidene) - 3 - (3 - ethyldihydrobenzthiazolylidene)-2-p-tolyliminopropane*

0.90 gm. of 3-methyl-3'-ethyl-9-p-toluidino-oxathia-carbocyanine iodide was suspended in 5 mls. of methyl alcohol and a solution of 0.06 gm. of sodium in 2 mls. of methyl alcohol added. After refluxing for 6 minutes, the mixture was cooled on ice and filtered. The solid was extracted in a Soxhlet extractor with dry ether, from which the product was obtained as yellow needles, m. pt. 203°. When the dye was incorporated in a silver chloride emulsion the sensitivity was extended to 5600 Å. with a maximum at 4950 Å.

EXAMPLE 10

*1 - (1:3:3 - trimethylindolinylidene) - 5 - (3 - methyldihydrobenzthiazolylidene) - 4 - p-ethoxyphenylimino-2-pentene*

0.3 gm. of 1:3:3:3'-tetramethyl-11-p-phenetidinoindo-thiadicarbocyanine iodide was dissolved in 10 mls. of spirit and a solution of 0.04 gm. of sodium in 2 mls. of ethyl alcohol added. The mixture was diluted with 20 mls. of water, the solid filtered off, dried and extracted in a Soxhlet extractor with ether. The product separated from the ether as yellow needles, m. pt. 199–201° C. When the dye was incorporated in a silver iodobromide emulsion the sensitivity was extended to 6600 Å. with a maximum at 6200 Å.

EXAMPLE 11

*1 - (1 - methyldihydroquinolylidene(2) - 3 - (3 - ethyl-dihydrobenzthiazolylidene)-2-p-tolyliminopropane*

0.30 gm. of 3-ethyl-1'-methyl-9-p-toluidinothiaquino-2-carbocyanine perchlorate was dissolved in 20 mls. of ethyl alcohol and a solution of 0.046 gm. of sodium in ethyl alcohol added. The mixture was stirred and diluted with water. The solid was filtered off, dried and extracted with ether. By concentration of the ether extracts the product was obtained as purple crystals, m. pt. 210–214° C. When the dye was incorporated in a silver iodobromide emulsion the sensitivity was extended to 6400 Å. with a maximum at 5700 Å.

EXAMPLE 12

*1 - (1 - methyldihydroquinolylidene(2)) - 3 - (3 - methyl-dihydrobenzthiazolylidene)-2-p-tolyliminopropane*

0.22 gm. of 3:1'-dimethyl-9-p-toluidinothiaquino-2-carbocyanine iodide was dissolved in 10 mls. of hot ethyl alcohol and an alcoholic solution of 0.046 gm. of sodium added. After dilution with water, the solid was filtered off, dried and extracted with ether. Concentration of the ether extracts gave the product as brownish-yellow crystals, m. pt. 220–228° C.

EXAMPLE 13

*3 - methyl - 3' - ethyl - 9 - methylanilinothiacarbocyanine iodide*

0.25 gm. of 1-(3-methyldihydrobenzthiazolylidene)- 3 - (3 - ethyldihydrobenzthiazolylidene)-2-phenylimino-propane was fused at 100° C. for 5½ hours with 0.5 gm. of methyl toluene-p-sulphonate. The melt was dissolved in 4.5 mls. of methyl alcohol and poured into a warm solution of potassium iodide. The dye was filtered off and crystallised in 10 mls. of methyl alcohol, from which it separated as green crystals, m. pt. 167–169° C.

EXAMPLE 14

*3 - methyl - 3' - ethyl - 9 - methylcyclohexylaminothia-carbocyanine iodide*

0.18 gm. of 1-(3-methyldihydrobenzthiazolylidene)-3- (3 - ethyl - dihydrobenzthiazolylidene) - 2 - cyclohexyl-iminopropane was heated under reflux with 10 mls. of freshly distilled methyl iodide for 7½ hours. After dilution with ether the dye was filtered off and purified by dissolving in a mixture of hot ethyl alcohol and ethyl acetate. A little solid which separated on cooling was discarded. Addition of ether to the filtrate precipitated the dye as an orange powder, m. pt. 160–163° C. When the dye was incorporated in a silver chlorobromide emulsion the sensitivity was extended to 5450 Å. with a maximum at 4900 Å.

EXAMPLE 15

*3 - methyl - 3' - ethyl - 9 - dimethylaminothiacarbocyanine perchlorate*

0.13 gm. of 1-(3-methyldihydrobenzthiazolylidene)-3-(3 - ethyl - dihydrobenzthiazolylidene) - 2 - methyliminopropane was heated with methyl iodide for 1½ hours. The product was precipitated by adding ether, filtered off, re-dissolved in spirit and the solution poured into aqueous potassium perchlorate solution. The dye was filtered off and purified by dissolving in 10 mls. of ethyl alcohol and precipitated by adding ether, when it was obtained as an orange powder, m. pt. 135–140° C. When the dye was incorporated in a silver chlorobromide emulsion the sensitivity was extended to 5350 Å. with a maximum at 4900 Å.

EXAMPLE 16

*3-methyl-3'-ethyl-9-methylethylaminothiacarbocyanine perchlorate*

0.15 gm. of 1-(3-methyldihydrobenzthiazolylidene)-3 - (3 - ethyl - dihydrobenzthiazolylidene) - 2 - methyliminopropane was heated for ½ hour with 2 mls. of ethyl iodide. After dilution with ether the dye was filtered off, re-dissolved in alcohol and poured into aqueous sodium perchlorate. After recrystallisation from 13½ mls. of ethyl alcohol the product was obtained as orange crystals, m. pt. 158–161° C. When the dye was incorporated in a silver chlorobromide emulsion the sensitivity was extended to 5300 Å. with a maximum at 4900 Å.

EXAMPLE 17

*3-methyl-3'-ethyl-9-methylbenzylaminothiacarbocyanine perchlorate*

0.20 gm. of 1-(3-methyldihydrobenzthiazolylidene)-3 - (3 - ethyl-dihydrobenzthiazolylidene)-2-methyliminopropane was heated for ½ hour with 2 mls. of benzyl bromide. After dilution with ether the dye was filtered off, re-dissolved in alcohol and poured into aqueous sodium perchlorate. The product was filtered off and crystallised from 17½ mls. of ethyl alcohol as orange crystals, m. pt. 134–136° C. When the dye was incorporated in a silver chlorobromide emulsion the sensitivity was extended to 5300 Å. with a maximum at 4900 Å.

EXAMPLE 18

*3-methyl-3'-ethyl-9-methyl-p-toluidino-oxathiacarbocyanine perchlorate*

0.18 gm. of 1-(3-methyldihydrobenzoxazolylidene)-3-(3 - ethyl-dihydrobenzthiazolylidene)-2-p-tolyliminopropane was heated with 2 mls. of methyl iodide for 1½ hours. After dilution with ether the dye was filtered off, re-dissolved in ethyl alcohol and poured into aqueous sodium perchlorate. After two recrystallisations the orange-red product melted at 220–224° C. When the dye was incorporated in a silver chloride emulsion the sensitivity was extended to 5650 Å. with a broad maximum at 5100 Å.

EXAMPLE 19

*1:3:3:3'-tetramethyl-11-methyl-p-phenetidino-indothiacarbocyanine iodide*

0.08 gm. of 1-(1:3:3-trimethylindolinylidene)-5-(3-methyldihydrobenzthiazolylidene) - 4-p-ethoxyphenylimino-2-pentene was refluxed for 2½ hours with 2 mls. of methyl iodide. The crude dye, 0.11 gm., was precipitated by the addition of ether and then purified by dissolving in ethyl alcohol and adding ether. The dark purple powder obtained had m. pt. 142–146° C.

EXAMPLE 20

*3-ethyl-3'-methyl-9-methylanilinothiacarbocyanine iodide*

0.11 gm. of 3-ethyl-3'-methyl-9-anilinothiacarbocyanine iodide was mixed with a solution of 0.0051 gm. of sodium in 0.22 ml. of methyl alcohol. On adding 1 ml. of methyl iodide a yellow solution was formed which when heated became red. After heating for 9 hours the solution was diluted with ether and the product filtered off. The crude dye was crystallised from 6 mls. of methyl alcohol to give green crystals, m. pt. 162° C.

Although many of the foregoing examples use only small quantities of the reagents, it is to be understood that larger quantities may be employed by the same processes to yield larger quantities of the dyestuffs described.

The present invention includes dyestuffs of general Formulae III and IV, processes for the production of such dyestuffs and photographic silver halide emulsions containing such dyestuffs in sensitising amount.

What we claim is:

1. Dyestuffs selected from the class consisting of dyestuffs of the general formula:

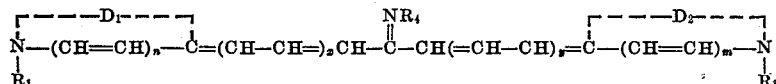

and quaternary salts thereof of the general formula:

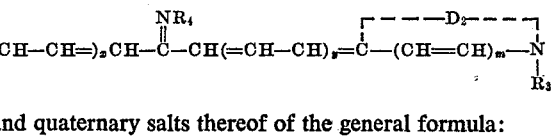

where $R_1$ and $R_3$ are each selected from the class consisting of alkyl, hydroxyalkyl and aralkyl groups, $R_4$ is selected from the class consisting of alkyl, cycloalkyl, aralkyl and aryl radicles, $R_5$ is selected from the class consisting of alkyl and aralkyl groups, $D_1$ and $D_2$ are each the residue of a five-membered or six-membered heterocyclic nitrogen nucleus of the type used in cyanine dyes, X is an acid radicle, and $n$, $x$, $y$ and $m$ are each selected from nought and one.

2. Process for the production of a dyestuff of the general formula:

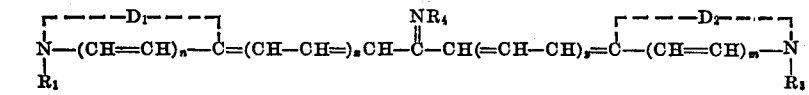

which comprises treating with a strong base a dyestuff of the general formula:

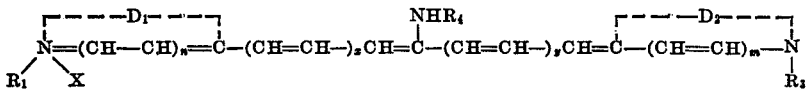

where $R_1$ and $R_3$ are each selected from the class consisting of alkyl, hydroxyalkyl and aralkyl groups, $R_4$ is selected from the class consisting of alkyl, cycloalkyl, aralkyl and aryl radicles, $D_1$ and $D_2$ are each the residue of a five-membered or six-membered heterocyclic nitrogen nucleus of the type used in cyanine dyes, X is a acid radicle, and $n$, $x$, $y$ and $m$ are each selected from nought and one.

3. Process according to claim 2 wherein the strong base employed is an alkali hydroxide.

4. Process according to claim 2 wherein the strong base employed is an alkali alkoxide.

5. Process for the production of a dyestuff of the general formula:

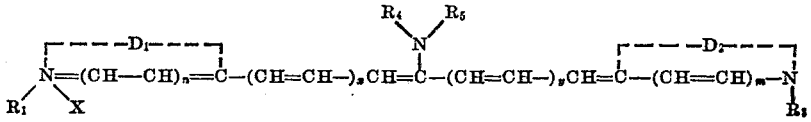

which comprises subjecting to treatment with a compound $R_5X$ a compound of the general formula:

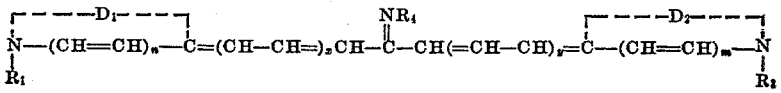

where $R_1$ and $R_3$ are each selected from the class consisting of alkyl, hydroxyalkyl and aralkyl groups, $R_4$ is selected from the class consisting of alkyl, cycloalkyl, aralkyl and aryl radicles, $R_5$ is selected from the class consisting of alkyl and aralkyl groups, $D_1$ and $D_2$ are each the residue of a five-membered or six-membered heterocyclic nitrogen nucleus of the type used in cyanine dyes, X is an acid radicle, and $n$, $x$, $y$ and $m$ are each selected from nought and one.

6. Process according to claim 5 wherein the compound $R_5X$ is an alkyl iodide.

References Cited in the file of this patent

UNITED STATES PATENTS

| | | |
|---|---|---|
| 2,166,736 | White et al. | July 18, 1939 |
| 2,169,434 | Schwarz | Aug. 15, 1939 |
| 2,263,749 | White et al. | Nov. 25, 1941 |
| 2,320,654 | Riester | June 1, 1943 |
| 2,322,015 | Hamer et al. | June 15, 1943 |
| 2,338,782 | Riester | Jan. 11, 1944 |
| 2,340,882 | Kendall | Feb. 8, 1944 |
| 2,353,164 | Kendall et al. | July 11, 1944 |
| 2,637,729 | Kendall | May 5, 1953 |

OTHER REFERENCES

Chem. Abstracts 16:3101 (Abstract of Brit. Med. Jour., 1922, I, 514–515).

Chem. Abstracts 19:530 (Abstract of Proc. Roy. Soc., London, 96B, 317–333, 1924).